United States Patent
Enomoto

(10) Patent No.: US 11,557,948 B2
(45) Date of Patent: Jan. 17, 2023

(54) RADIAL-GAP-TYPE ROTARY ELECTRIC MACHINE, PRODUCTION METHOD FOR RADIAL-GAP-TYPE ROTARY ELECTRIC MACHINE, PRODUCTION DEVICE FOR ROTARY ELECTRIC MACHINE TEETH PIECE, AND PRODUCTION METHOD FOR ROTARY ELECTRIC MACHINE TEETH MEMBER

(71) Applicant: Hitachi Metals, Ltd., Tokyo (JP)

(72) Inventor: Yuji Enomoto, Tokyo (JP)

(73) Assignee: Hitachi Metals, Ltd., Tokyo (JP)

(*) Notice: Subject to any disclaimer, the term of this patent is extended or adjusted under 35 U.S.C. 154(b) by 279 days.

(21) Appl. No.: 16/650,976

(22) PCT Filed: Sep. 27, 2018

(86) PCT No.: PCT/JP2018/035905
§ 371 (c)(1),
(2) Date: Mar. 26, 2020

(87) PCT Pub. No.: WO2019/065827
PCT Pub. Date: Apr. 4, 2019

(65) Prior Publication Data
US 2020/0259403 A1 Aug. 13, 2020

(30) Foreign Application Priority Data
Sep. 29, 2017 (JP) .............................. JP2017-190456

(51) Int. Cl.
*H02K 16/02* (2006.01)
*H02K 1/27* (2022.01)
(Continued)

(52) U.S. Cl.
CPC ............. *H02K 16/02* (2013.01); *H02K 1/146* (2013.01); *H02K 1/276* (2013.01); *H02K 1/278* (2013.01);
(Continued)

(58) Field of Classification Search
CPC ........ H02K 16/02; H02K 1/146; H02K 1/276; H02K 1/278; H02K 1/2786; H02K 3/522;
(Continued)

(56) References Cited

U.S. PATENT DOCUMENTS 7,103,961 B2* 9/2006 Fujita .................... H02K 1/146
29/904
2002/0074885 A1 6/2002 Decristofaro et al.
(Continued)

FOREIGN PATENT DOCUMENTS

CN 202957727 U 5/2013
JP 64-034114 U 3/1989
(Continued)

OTHER PUBLICATIONS

International Search Report—English Translation, PCT/JP2018/035905, dated Dec. 4, 2018, 1 pg.
(Continued)

*Primary Examiner* — Thomas Truong
(74) *Attorney, Agent, or Firm* — Volpe Koenig

(57) ABSTRACT

A radial-gap-type rotary electric machine, a production method therefore, a production device for a rotary electric machine teeth piece, and a production method therefore can achieve a high efficiency and have excellent productivity. A radial-gap-type rotary electric machine includes a rotation shaft, a rotator including an inner-peripheral-side rotator iron core rotatable around the rotation shaft and an outer-peripheral-side rotator iron core arranged on an outer peripheral side of the inner-peripheral-side rotator iron core and
(Continued)

rotatable around the rotation shaft, and a stator disposed between the inner-peripheral-side rotator iron core and the outer-peripheral-side rotator iron core. A permanent magnet is provided on at least one of an outer-peripheral-side surface of the inner-peripheral-side rotator iron core and an inner-peripheral-side surface of the outer-peripheral-side rotator iron core. The stator includes a stator iron core including teeth formed of laminated bodies where amorphous metal foil strip pieces are held with mutual friction.

8 Claims, 13 Drawing Sheets

(51) Int. Cl.
  *H02K 1/14* (2006.01)
  *H02K 1/276* (2022.01)
  *H02K 1/278* (2022.01)
  *H02K 1/2786* (2022.01)
  *H02K 3/52* (2006.01)
  *H02K 15/02* (2006.01)
  *H02K 15/03* (2006.01)

(52) U.S. Cl.
  CPC ........... *H02K 1/2786* (2013.01); *H02K 3/522* (2013.01); *H02K 15/022* (2013.01); *H02K 15/03* (2013.01); *H02K 2203/12* (2013.01)

(58) Field of Classification Search
  CPC .. H02K 15/022; H02K 15/03; H02K 2203/12; H02K 1/148; H01F 3/04
  See application file for complete search history.

(56) References Cited

U.S. PATENT DOCUMENTS

| | | | |
|---|---|---|---|
| 2016/0268866 A1* | 9/2016 | Matsumoto | H02K 3/521 |
| 2018/0159408 A1* | 6/2018 | Hattori | H02K 21/12 |
| 2020/0080246 A1* | 3/2020 | Miyake | H02K 21/12 |

FOREIGN PATENT DOCUMENTS

| | | | |
|---|---|---|---|
| JP | 2001-018109 A | 1/2001 | |
| JP | 2002-530042 A | 9/2002 | |
| JP | 2003-309952 A | 10/2003 | |
| JP | 2013-21919 A | 1/2013 | |
| JP | 2013-118254 A | 6/2013 | |
| JP | 2014-155347 A | 8/2014 | |
| JP | 2016-077149 A | 5/2016 | |
| JP | 2017-123767 A | 7/2017 | |

OTHER PUBLICATIONS

Taiwan Office Action with Search Report, Application No. 107134063 dated Jun. 27, 2019, 7pgs.
Japanese Office Action dated Sep. 29, 2020 for Japanese Patent Application No. 2019-545606.
Chinese Office Action dated Jul. 16, 2021 for Chinese Patent Application No. 201880058413.1.

* cited by examiner

RADIAL-GAP-TYPE ROTARY ELECTRIC MACHINE, PRODUCTION METHOD FOR RADIAL-GAP-TYPE ROTARY ELECTRIC MACHINE, PRODUCTION DEVICE FOR ROTARY ELECTRIC MACHINE TEETH PIECE, AND PRODUCTION METHOD FOR ROTARY ELECTRIC MACHINE TEETH MEMBER

TECHNICAL FIELD

The present invention relates to a radial-gap-type rotary electric machine, a production method for the radial-gap-type rotary electric machine, a production device for a rotary electric machine teeth piece, and a production method for a rotary electric machine teeth member, and especially relates to a radial-gap-type rotary electric machine, a production method for the radial-gap-type rotary electric machine, a production device for a rotary electric machine teeth piece, and a production method for a rotary electric machine teeth member using an amorphous metal for an iron core.

BACKGROUND ART

A rotary electric machine (a motor) used for a power source of an industrial machine and for driving an automobile is required to be highly efficient. For the high efficiency of the motor, a design using a low-loss material as a material to be used or using a permanent magnet having a high energy product is common.

The motor has a loss constituted of mainly a copper loss, an iron loss, and a machine loss. When output characteristics (a rotational speed and a torque) in a required specification are determined, the machine loss is uniquely determined. Thus, a design to reduce the iron loss and the copper loss is important. The copper loss is mainly determined from a relationship between a resistance value and a current of a coil. Thus, a design to reduce the coil resistance value and suppress reduction in a residual magnetic flux density of a magnet by cooling is performed. The iron loss can be reduced by a soft magnetic material to be used. In a common motor, an electromagnetic steel plate is employed as an iron core part, and the ones having different loss levels depending on, for example, its thickness and its contained amount of Si are used.

As the soft magnetic material, there is a high-performance material such as an iron-base amorphous metal and an iron-base nanocrystalline alloy having magnetic permeability higher than that of the electromagnetic steel plate and an iron loss lower than that of the electromagnetic steel plate. However, their material system has, for example, a very thin plate thickness of 0.025 mm, a Vickers hardness of about 900, and a hardness that is five times or more of that of the electromagnetic steel plate, thus having many problems for efficiently and inexpensively producing the motor.

PTL 1 is an example that applies an amorphous metal to a radial-gap-type rotary electric machine. PTL 1 discloses a bulk amorphous metal magnetic component having the shape of a polyhedron and including a plurality of layers of amorphous metal strips for use in highly efficient electric motors. PTL 1 proposes the following method. In the method, amorphous metal strip material is cut to form a plurality of cut strips having a predetermined length, the cut strips are stacked to form a bar of stacked amorphous metal strip material and annealed, the annealed, stacked bar is impregnated with an epoxy resin and cured, and the stacked bar is then cut at predetermined lengths to provide a plurality of polyhedrally shaped magnetic components having a predetermined three-dimensional geometry.

PTL 2 discloses a method for producing an amorphous laminated iron core by punching out an amorphous thin plate material into iron core pieces to laminate them. In the method, the amorphous thin plate material is punched out to form required portions of the iron core pieces and form concatenation holes, blanking is performed on the iron core pieces through a die hole, the iron core pieces are laminated until having a desired thickness on a cradle that faces the die hole from below and freely moves back and forth, the cradle is retreated from below the die hole and a laminated iron core laminated on this cradle is gripped and restrained, and an adhesive binder is injected through the concatenation hole of the laminated iron core to fill it for connection. PTL 2 shows an example that punches a predetermined motor core shape with a progressive die similarly to press-punching an electromagnetic steel plate into a core of the motor. In this example, shape processing can be performed by punching, but it is impossible to perform caulk-fastening between plates achieved by the electromagnetic steel plates because an amorphous foil strip is too thin. Thus, a method that injects an adhesive through a predetermined hole of the core to perform laminated adhesion in a state laminated in a jig is proposed.

CITATION LIST

Patent Literature

PTL 1: Japanese Patent Application Laid-Open No. 2013-21919

PTL 2: Japanese Patent Application Laid-Open No. 2003-309952

SUMMARY OF INVENTION

Technical Problem

The above-described methods for applying the amorphous metal to the radial-gap-type rotary electric machine shown in PTLs 1 and 2 have problems in a device for performing particular machining and time-consuming processing in its production.

Furthermore, in PTL 2, the amorphous metal is pressed and laminated. The amorphous metal has a thickness $\frac{1}{10}$ or less than that of the electromagnetic steel plate, thus requiring ten times number of pressing. The amorphous metal is five times harder than the electromagnetic steel plate, thus making five times as much influence on a die. Accordingly, the influence on the die is 50 times or more than that of the electromagnetic steel plate. Usually, the production is performed while repolishing the die every about two million times, but the number of times before the repolishing becomes $\frac{1}{50}$ or less, thus substantially increasing a production cost. When the pressing is performed at a speed of 180 SPM (shot per minutes) per minute, the pressing exceeds two million times in about one month. When the pressing is performed at an identical speed, a production takt time takes 10 times due to the number. Thus, the die has to be repolished in less than one day. In addition, for polishing of the die and the punch of a large-sized die, a large number of processes are taken including a labor such as loading and unloading of the die to/from a press device. Thus, it is shown that the production in this condition is impractical.

As described above, it is a fact that, for the production of the radial-gap-type motor using the amorphous metal, a structure producible at a practical level and its production device and production method have not been found out.

In consideration of the above-described circumstances, it is an object of the present invention to provide a radial-gap-type rotary electric machine, a production method for the radial-gap-type rotary electric machine, a production device for a rotary electric machine teeth piece, and a production method for a rotary electric machine teeth member using an amorphous metal that can achieve a high efficiency and have excellent productivity.

Solution to Problem

To solve the above-described problem, the present invention provides a radial-gap-type rotary electric machine that includes a rotation shaft, a rotator, and a stator. The rotator includes an inner-peripheral-side rotator iron core rotatable around the rotation shaft and an outer-peripheral-side rotator iron core arranged on an outer peripheral side of the inner-peripheral-side rotator iron core and rotatable around the rotation shaft. The stator is disposed between the inner-peripheral-side rotator iron core and the outer-peripheral-side rotator iron core. A permanent magnet is provided on at least one of an outer-peripheral-side surface of the inner-peripheral-side rotator iron core and an inner-peripheral-side surface of the outer-peripheral-side rotator iron core. The above-described stator includes a stator iron core including teeth formed of laminated bodies where amorphous metal foil strip pieces are held with mutual friction.

To solve the above-described problem, the present invention provides a production device for a rotary electric machine teeth piece. The production device includes a cutting station that shears an amorphous-metal-foil-strip material sheet into a trapezoidal shape. The above-described cutting station includes a shearing blade reciprocatable in a direction perpendicular to the amorphous-metal-foil-strip material sheet and having mutually different angles with respect to a width direction of the amorphous-metal-foil-strip material sheet, cuts legs having different angles with this shearing blade, and produces a trapezoidal-shaped amorphous metal foil strip piece.

To solve the above-described problem, the present invention provides a production method for a rotary electric machine teeth member. The production method includes a cutting step of cutting legs having different angles with a shearing blade reciprocatable in a direction perpendicular to an amorphous-metal-foil-strip material sheet and having mutually different angles with respect to a width direction of the amorphous-metal-foil-strip material sheet to produce a trapezoidal-shaped amorphous metal foil strip piece, a laminating step of laminating the trapezoidal-shaped amorphous metal foil strip pieces to produce teeth, and an inserting and holding step of inserting the teeth into a bobbin and winding a coil conductor around the bobbin to produce a teeth member.

To solve the above-described problem, the present invention provides a production method for a radial-gap-type rotary electric machine. The radial-gap-type rotary electric machine includes a rotation shaft, a rotator, and a stator. The rotator includes an inner-peripheral-side rotator iron core rotatable around the rotation shaft and an outer-peripheral-side rotator iron core arranged on an outer peripheral side of the inner-peripheral-side rotator iron core and rotatable around the rotation shaft. The stator is disposed between the inner-peripheral-side rotator iron core and the outer-peripheral-side rotator iron core. A permanent magnet is provided on at least one of an outer-peripheral-side surface of the inner-peripheral-side rotator iron core and an inner-peripheral-side surface of the outer-peripheral-side rotator iron core. The stator includes a stator iron core including teeth formed of laminated bodies where amorphous metal foil strip pieces are held with mutual friction. The production method includes producing the stator using the above-described teeth member.

A more specific configuration of the present invention will be described in claims.

Advantageous Effects of Invention

The present invention can provide the radial-gap-type rotary electric machine, the production method for the radial-gap-type rotary electric machine, the production device for the rotary electric machine teeth piece, and the production method for the rotary electric machine teeth member using the amorphous metal that can achieve the high efficiency and have the excellent productivity.

Problems, configurations, and effects other than the ones described above will be made apparent from the following description of embodiments.

DESCRIPTION OF EMBODIMENTS

The following describes an embodiment of the present invention using the drawings and the like.

Figure 12A:
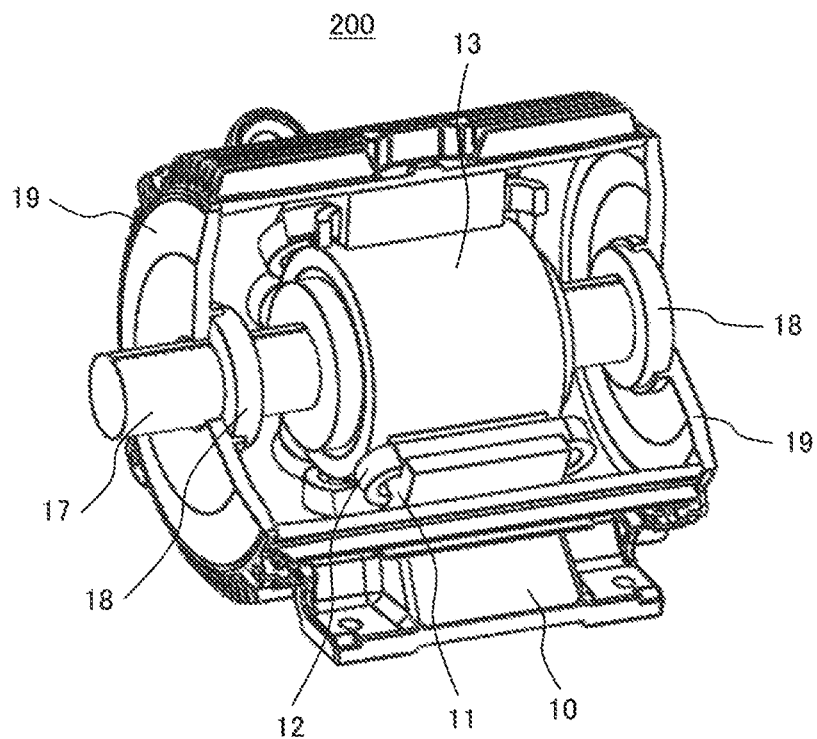
FIG. 12A is a schematic diagram illustrating a structure of a conventional radial-gap-type motor (an inner rotor type).
Figure 12B:
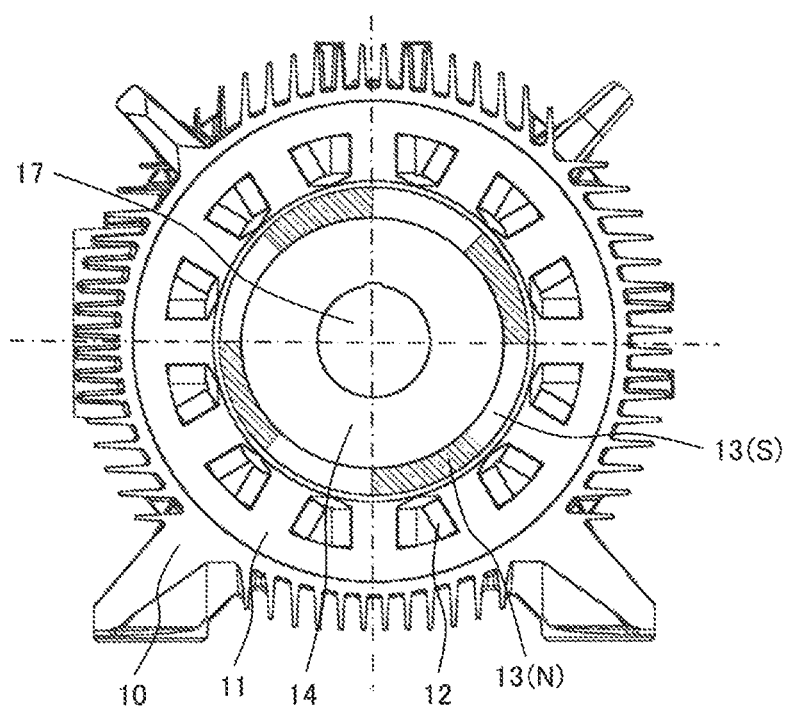
FIG. 12B is a transverse sectional view of FIG. 12A.

Prior to a description of a radial-gap-type rotary electric machine of the present invention, a configuration of a conventional radial-gap-type rotary electric machine will be described. FIG. 12A is a schematic diagram illustrating a structure of a conventional radial-gap-type motor (an inner rotor type). FIG. 12B is a transverse sectional view of FIG. 12A. As illustrated in FIG. 12A and FIG. 12B, a radial-gap-type motor 200 has a common cylindrical shape. A stator iron core (a stator core) 11 is arranged on a center in an axial direction of a housing 10 having an outer part on which a heat radiating fin is disposed.

The stator iron core 11 has a slot part on which a stator coil 12, which is wound around a teeth part, is mounted. Inside this stator, a rotator including permanent magnets 13 and a rotator iron core (a magnetic core) 14 is rotatably held via bearings 18. The bearings 18, which are held by end brackets 19 disposed on both ends in the axial direction of the housing, hold the rotator in the axial direction and a gravity direction. The rotator has a center on which a rotation shaft (a shaft) 17 is installed. The rotation shaft 17 passes through a hole of a front-side end bracket 19, thus constituting an output shaft.

As illustrated in FIG. 12B, the rotator iron core 14 is arranged around the shaft 17, and the permanent magnets 13 are arranged on a surface thereof. FIG. 12B illustrates an eight-pole structure that is a structure where N-pole magnets 13(N) and S-pole magnets 13(S) are alternately arranged.

The stator iron core is made of a soft magnetic material. Generally, the stator iron core is configured such that an electromagnetic steel plate is used and punched out with a press die to be laminated. The amorphous metal is a material that has a loss substantially smaller than that of the electromagnetic steel plate to ensure contribution to a high efficiency of a motor. However, as described above, its hardness is very high, thus having difficulty punching it into a slot-type motor core as illustrated in the drawing with a press for lamination. Therefore, it is difficult to apply the amorphous metal to a rotary electric machine having the structure illustrated in FIG. 12A and FIG. 12B.

Figure 13A:
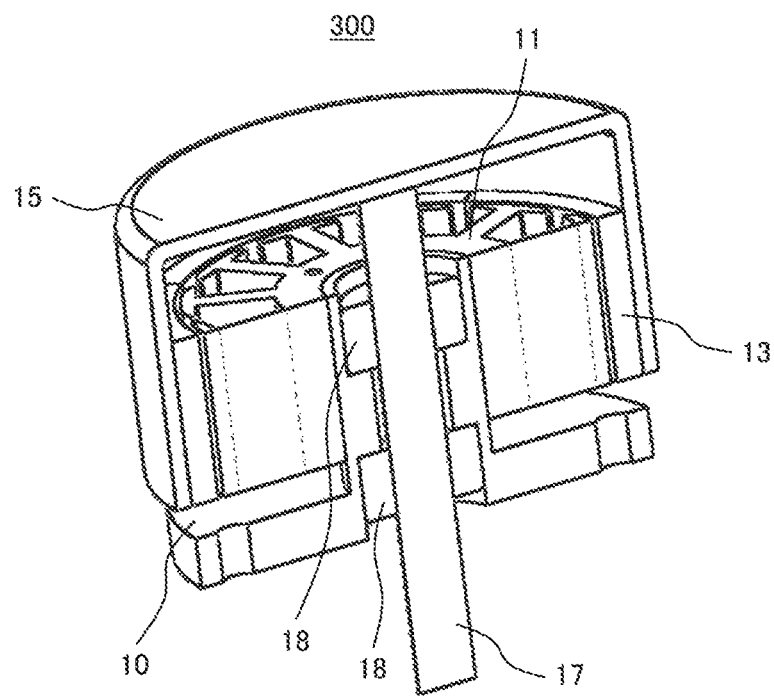
FIG. 13A is a schematic diagram illustrating a structure of a conventional radial-gap-type motor (an outer rotor type).
Figure 13B:
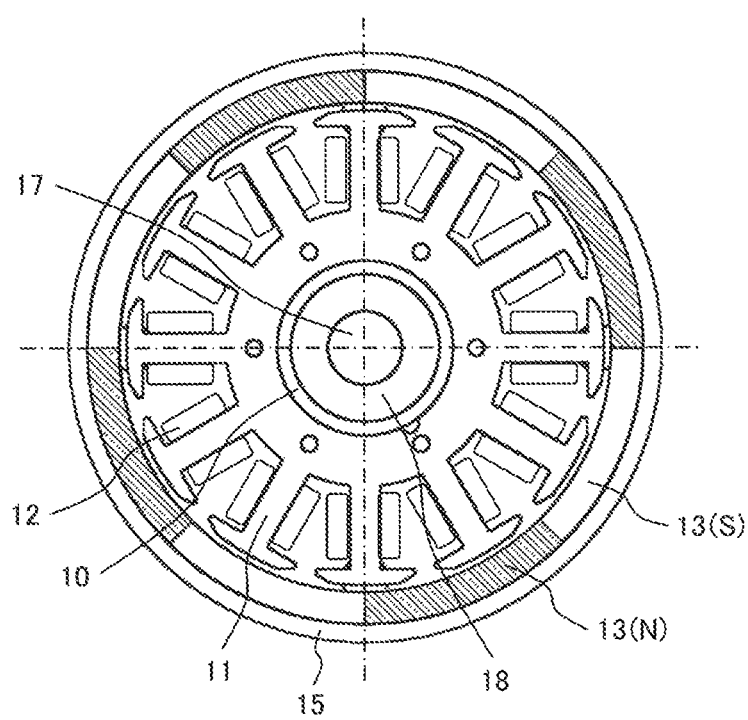
FIG. 13B is a transverse sectional view of FIG. 13A.

FIG. 13A is a schematic diagram illustrating a structure of a conventional radial-gap-type motor (an outer rotor type). FIG. 13B is a transverse sectional view of FIG. 13A. As illustrated in FIG. 13A and FIG. 13B, a rotary electric machine 300 includes a stator iron core 11 outside a housing and bearing holder 10 by press fitting, shrink fitting, or the like. The housing holds two bearings 18. A shaft combined with the rotator iron core is rotatably held by the two bearings 18. The stator coil 12 is wound around the stator iron core 11 to be configured such that a stator becomes an electromagnet. In a rotator, a permanent magnet 13 is arranged inside a cup-shaped core. FIGS. 13A and 13B illustrate an eight-pole structure that is a structure where N-pole magnets 13(N) and S-pole magnets 13(S) are alternately arranged.

The stator iron core is made of a soft magnetic material. Generally, the stator iron core is configured such that an electromagnetic steel plate is used and punched out with a press die to be laminated. The amorphous metal is a material that has a loss substantially smaller than that of the electromagnetic steel plate to ensure contribution to a high efficiency of a motor. However, as described above, its hardness is very high, thus having difficulty punching it into a slot-type motor core as illustrated in the drawing with a press for lamination. Therefore, it is difficult to apply the amorphous metal to a rotary electric machine having the structure illustrated in FIG. 13A and FIG. 13B.

[Radial-Gap-Type Rotary Electric Machine]

Figure 1A:
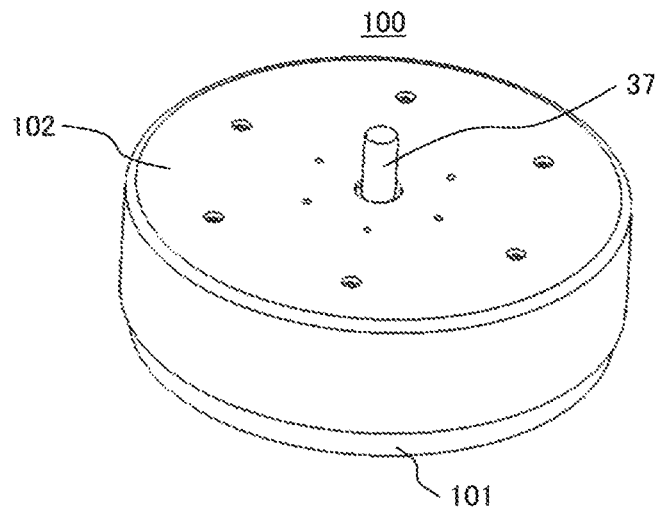
FIG. 1A is a perspective view illustrating a first example of a radial-gap-type rotary electric machine of the present invention.
Figure 1B:
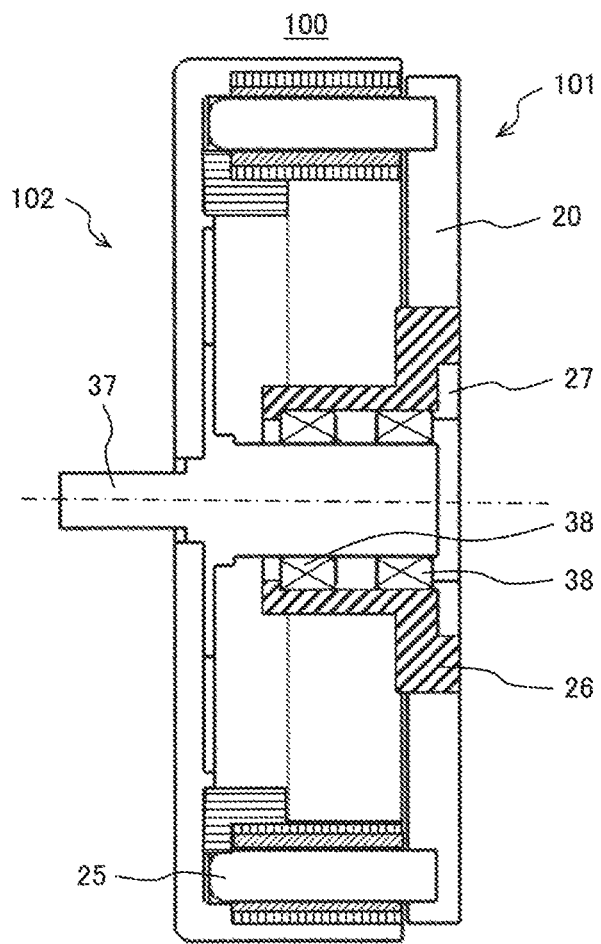
FIG. 1B is a vertical cross-sectional view of FIG. 1A.

Subsequently, a description will be given of the radial-gap-type rotary electric machine of the present invention. The radial-gap-type rotary electric machine of the present invention has a configuration to which the amorphous metal is applicable. FIG. 1A is a perspective view illustrating a first example of the radial-gap-type rotary electric machine of the present invention. FIG. 1B is a vertical cross-sectional view of FIG. 1A. As illustrated in FIG. 1A and FIG. 1B, a radial-gap-type rotary electric machine 100 includes a cup-shaped stator 101 having an opening portion at one end and a cup-shaped rotator 102 that covers the opening portion of this stator 101.

A rotation shaft (a shaft) 37 is rotatably held by a bearing 38. The rotator 102 has a configuration rotatable around the rotation shaft 37 while having a clearance (a gap) with the stator 101. The following describes the configurations of the stator 101 and the rotator 102 in detail.

Figure 2A:
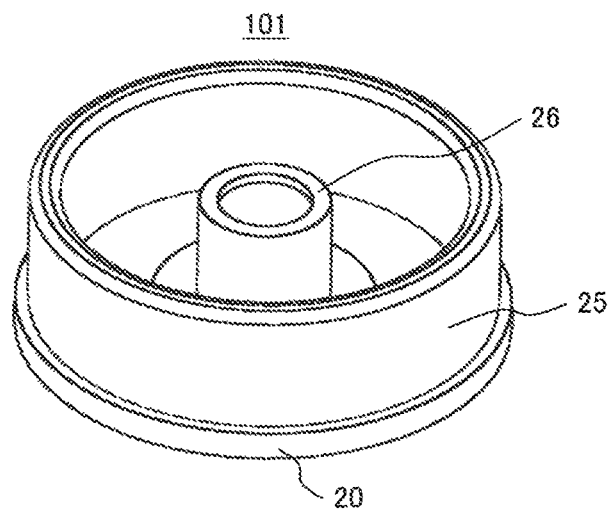
FIG. 2A is a perspective view illustrating a stator in FIG. 1A.
Figure 2B:
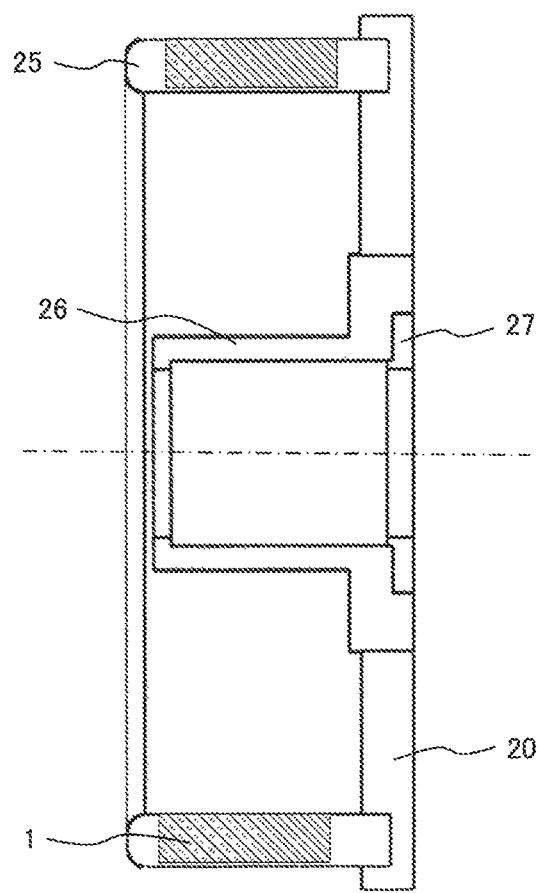
FIG. 2B is a transverse sectional view of FIG. 2A.

FIG. 2A is a perspective view illustrating the stator 101 in FIG. 1A. FIG. 2B is a vertical cross-sectional view of FIG. 2A. As illustrated in FIG. 2A and FIG. 2B, the stator 101 includes a bearing holding portion 26 which holds the bearing 38 illustrated in FIG. 1B, an annular-shaped stator iron core 25, and a stator base 20 which holds the stator iron core 25. As illustrated in FIG. 2B, the bearing holding portion 26 is fixed to the stator base 20 as a chassis of a stator by a bearing holding plate 27. The stator iron core 25 includes teeth 1 configured from laminated bodies of trapezoidal-shaped amorphous metal foil strip pieces formed of an amorphous metal foil strip. It is a configuration where the stator iron core 25 has a lower end portion that is integrated with the chassis (the stator base 20) of the stator with resin.

Figure 3A:
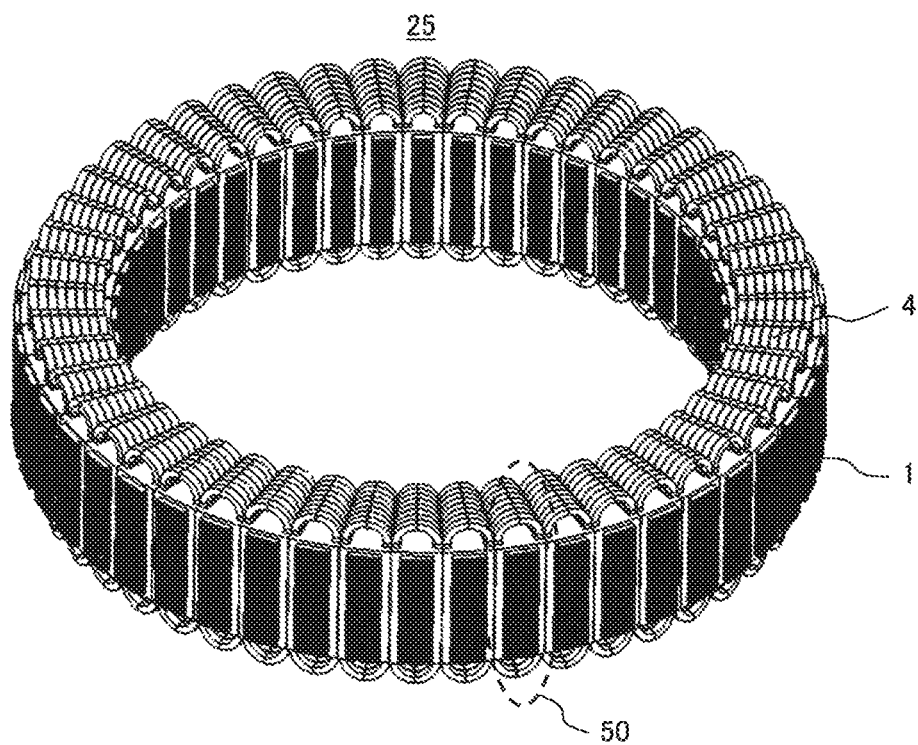
FIG. 3A is a perspective view illustrating a stator iron core in FIG. 2A in more detail.
Figure 3B:
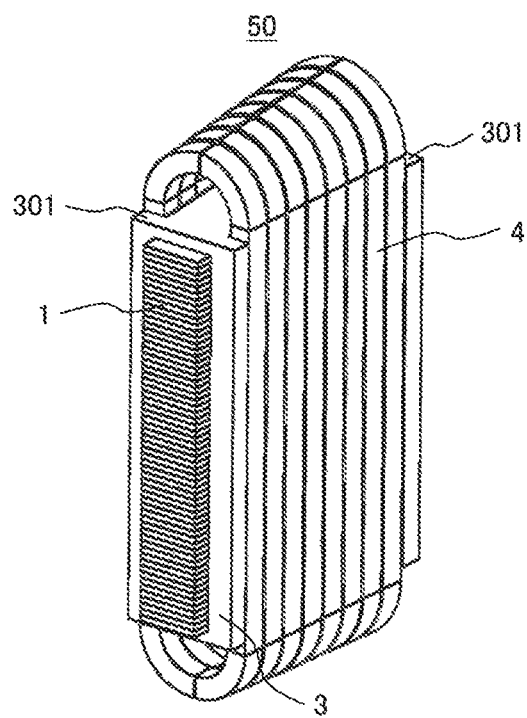
FIG. 3B is an enlarged schematic diagram of a teeth member in FIG. 3A.

FIG. 3A is a perspective view illustrating the stator iron core 25 in FIG. 2A in more detail. FIG. 3B is an enlarged schematic view of a teeth member 50 in FIG. 3A. As illustrated in FIG. 3A, the stator iron core 25 is configured such that a plurality of (48 in FIG. 3A) teeth members 50 are arrayed in an annular shape to be fixed with a resin mold. The stator iron core 25 is fixed to the stator base 20 illustrated in FIGS. 2A and 2B with the resin mold. The stator base 20 may be integrated with the resin mold.

As illustrated in FIG. 3B, the teeth member 50 includes the tooth 1 formed of the laminated body where a plurality of trapezoidal-shaped amorphous metal foil strip pieces are laminated, a resin-made bobbin 3 that hold the tooth 1, and a coil conductor 4 wound around the resin-made bobbin (resin bobbin) 3. That is, as illustrated in FIG. 3A and FIG. 3B, it is a structure where the coil conductor 4 is held between a plurality of arranged resin-made bobbins 3. In FIG. 3B, the coil conductor 4 is wound eight times by concentrated winding, but it may be distributed winding or winding of a large number of thin wires. Positioning of adjacent teeth members 50 may be performed such that a protrusion 301 or the like is disposed on a surface of the resin bobbin 3. Such a configuration can enhance a position accuracy in a circumferential direction of each teeth member 50.

Figure 4A:
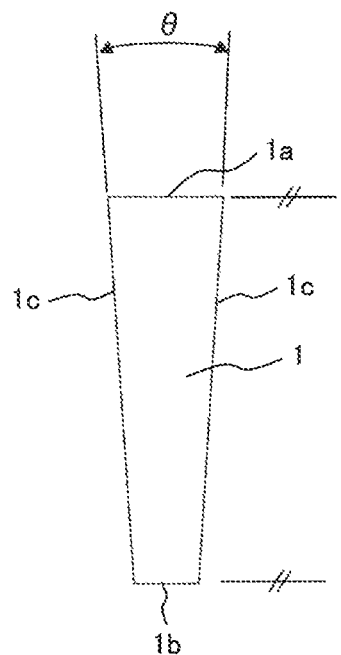
FIG. 4A is a diagram schematically illustrating an upper surface of a tooth 1.
Figure 4B:
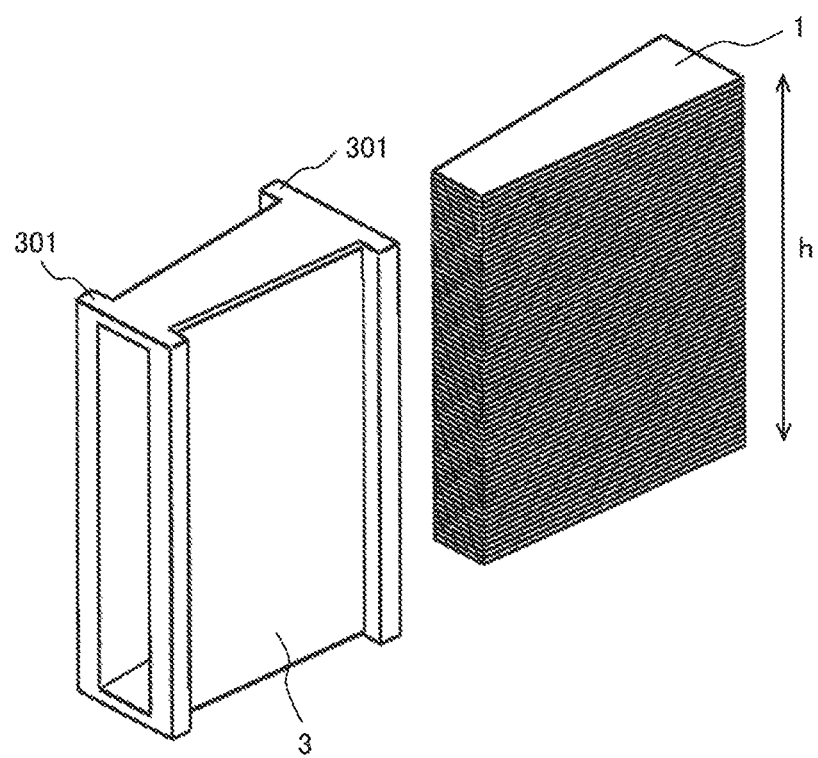
FIG. 4B is a perspective view schematically illustrating the teeth 1 and a resin-made bobbin.
Figure 4C:
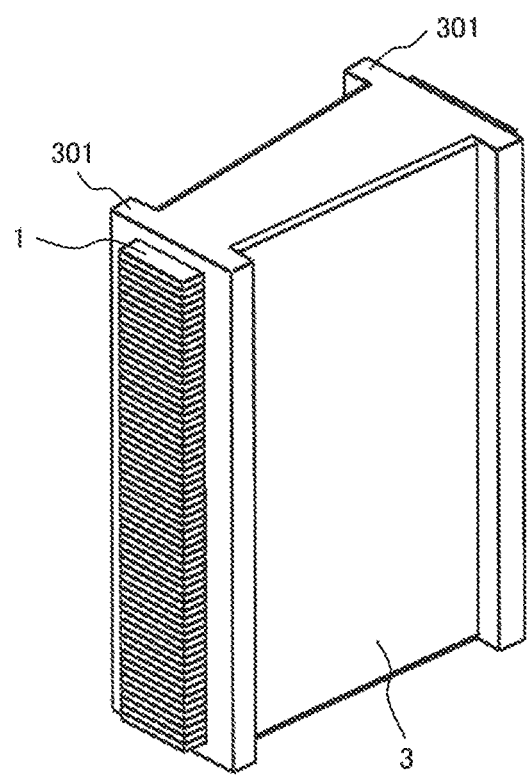
FIG. 4C is a perspective view schematically illustrating the tooth 1 and a resin-made bobbin.

FIG. 4A is a diagram schematically illustrating an upper surface of the tooth 1. FIG. 4B and FIG. 4C are perspective views schematically illustrating the tooth 1 and the resin-made bobbin 3. As illustrated in FIG. 4A to FIG. 4C, the tooth 1 has a configuration where the laminated body where a plurality of amorphous metal foil strip pieces are laminated is inserted into the resin bobbin 3 to be frictionally held in a lamination thickness direction of the laminated body. That is, the friction between laminated surfaces of the metal foil strip pieces, which is caused such that amorphous is used for the metal foil strip and it is laminated one by one, causes deviation to be less likely to occur between the respective metal foil strip pieces, thus ensuing the holding without using an adhesive or the like especially. Accordingly, it is configured such that the plurality of amorphous metal foil strip pieces are not separated one another. For example, a laminated body obtained such that 1200 amorphous metal foil strip pieces having a thickness of 0.025 mm are laminated in a direction of the rotation shaft to have a height h≈30 mm can be used as the tooth 1.

As illustrated in FIG. 4A, the amorphous metal foil strip piece that constitutes the tooth 1 has a pair of parallel bottom sides (a long side 1a and a short side 1b). An angle θ between a pair of sides (legs 1c) between the long side and the short side has an angle obtained such that one round 360° of the stator iron core is divided by the number of slots of the stator iron core. For example, when the number of slots is 48, θ=360°÷48=7.5°.

As illustrated in FIG. 4C, it may have a configuration where distal ends of the amorphous metal foil strip pieces protrude from the resin bobbin. Such a configuration can cover a protruding part with the resin mold to surely fix the amorphous metal foil strip pieces that constitute the laminated body.

A material of the amorphous metal is not especially limited, but it is preferable to use, for example, Metglas 2605HB1M (composition: Fe—Si—B), Metglas 2605SA1 (composition: Fe—Si—B), Metglas 2605S3A (composition: Fe—Si—B—Cr), and Metglas 2705M (composition: Co—Fe—Ni—Si—B—Mo) manufactured by Hitachi Metals, Ltd. The above-described "Metglas" is a registered trademark of Metglas Incorporated, which is a group company of Hitachi Metals, Ltd.

Figure 5A:
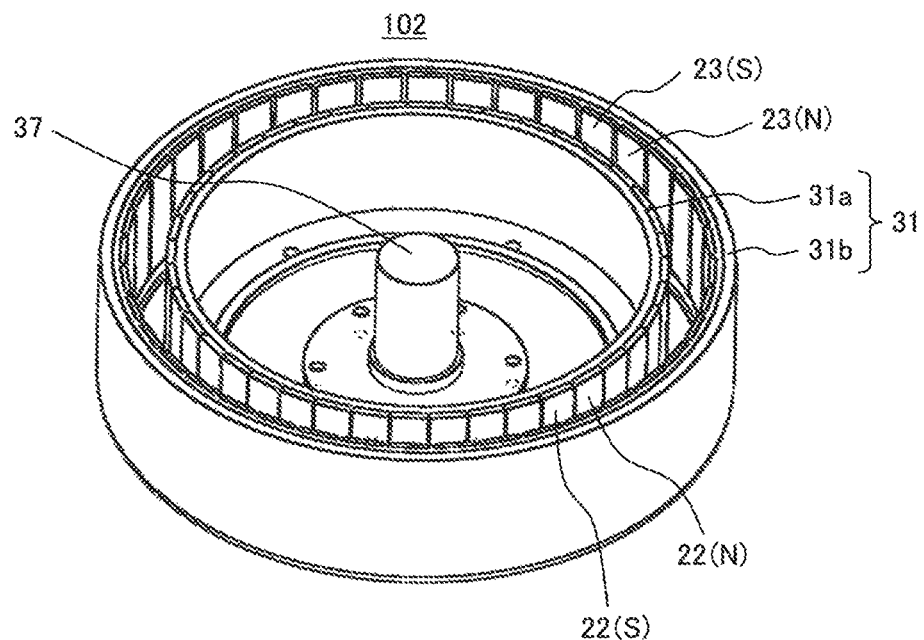
FIG. 5A is a perspective view illustrating an exemplary rotator that constitutes the radial-gap-type rotary electric machine of the present invention.
Figure 5B:
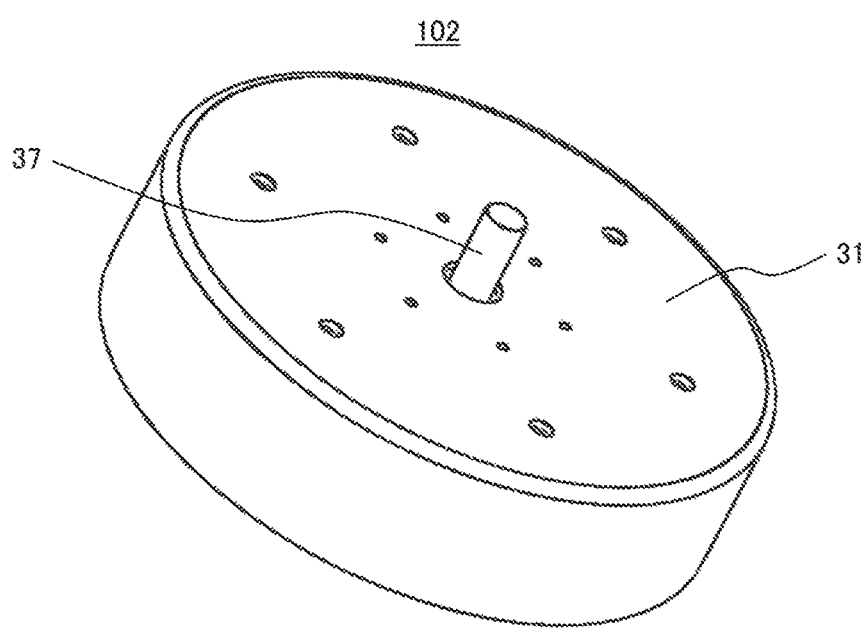
FIG. 5B is a perspective view illustrating an exemplary rotator that constitutes the radial-gap-type rotary electric machine of the present invention.
Figure 5C:
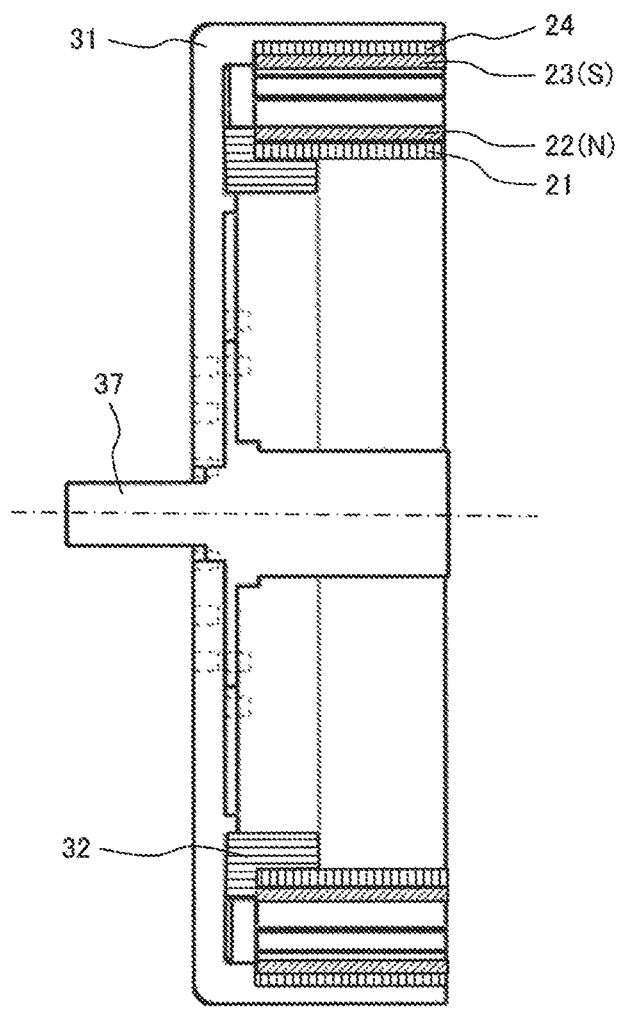
FIG. 5C is a vertical cross-sectional view of FIG. 5A.

FIG. 5A and FIG. 5B are perspective views illustrating the rotator 102 that constitutes the radial-gap-type rotary electric machine of the present invention. FIG. 5C is a vertical cross-sectional view of FIG. 5A. FIG. 5A is a drawing viewing an inside of the rotator iron core 31 having the cup shape. FIG. 5B is a drawing viewing an outside of the rotator iron core 31 having the cup shape.

As illustrated in FIG. 5A, the rotator iron core 31 includes an inner-peripheral-side rotator iron core 31a and an outer-peripheral-side rotator iron core 31b. The inner-peripheral-side rotator iron core 31a and the outer-peripheral-side rotator iron core 31b have a gap between both and have respective configurations rotatable around the rotation shaft 37. The rotary electric machine having such a configuration is referred to as a "dual gap type."

The rotator 102 having the cup shape internally includes a ring-shaped holding member 32 for holding the inner-peripheral-side rotator iron core 31a. The inner-peripheral-side rotator iron core 31a includes a soft magnetic material 21 and a permanent magnet (a rotator magnet) 22 that are mounted on the ring-shaped holding member 32. The outer-peripheral-side rotator iron core 31b includes a soft magnetic material 24 and a permanent magnet (a rotator magnet) 23 that are mounted outside the soft magnetic material 21 and the permanent magnet 22. Furthermore, it is a structure where the rotation shaft 37 is arranged at a center of the cup-shaped rotator 102. The respective members can be fixed by fastening using a screw or the like, bonding, and welding, and depending on the part, with a way such as press-fitting and shrink fitting. The soft magnetic materials 21, 24 arranged on the rotator 102 may be laminated bodies of the electromagnetic steel plates or the like and may be lumps of iron such as shafts since they are yoke of a DC magnetic field source.

Figure 6:
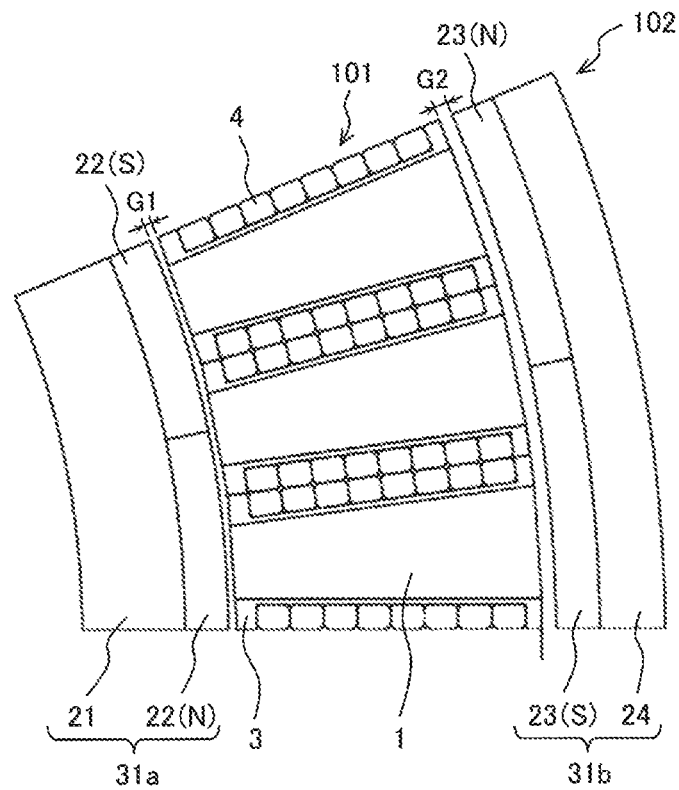
FIG. 6 is a top view of a part of the first example of the radial-gap-type rotary electric machine of the present invention.

FIG. 6 is a top view illustrating the first example of the radial-gap-type rotary electric machine of the present invention. The configuration in FIG. 6 is formed such that the above-described stator 101 and rotator 102 are combined. The permanent magnet 22 of the rotator 102 has an outside that has a configuration rotatable having a gap G1 with the stator 101. The permanent magnet 23 of the rotator 102 has an inside that has a configuration rotatable having a gap G2 with the stator 101.

Conventionally, there has been a technique to apply the amorphous metal to a two-rotor-type axial gap motor. This two-rotor-type axial gap motor has a structure where gaps are axially opposed. Thus, a very large axial absorbing force is generated when one side rotor is assembled. After the second rotor is assembled, the absorbing force is balanced. However, depending on an error in gap dimensions or the like, a case where the absorbing force is left on one side occurs. It is the structure also having difficulty assembling while equally managing the gaps. It is the structure also having difficulty holding a magnet mounted on a rotator with respect to a centrifugal force because the rotator has a large diameter.

In the radial-gap-type rotary electric machine of the present invention illustrated in FIG. 6, the permanent magnets 22, 23 are preliminarily configured as the rotators. Thus, in the assembling, the stator inside and outside gaps G1, G2 are simultaneously assembled. This ensures the assembling regardless of the absorbing force as the problem in the case of the above-described axial-gap-type motor.

Figure 7:
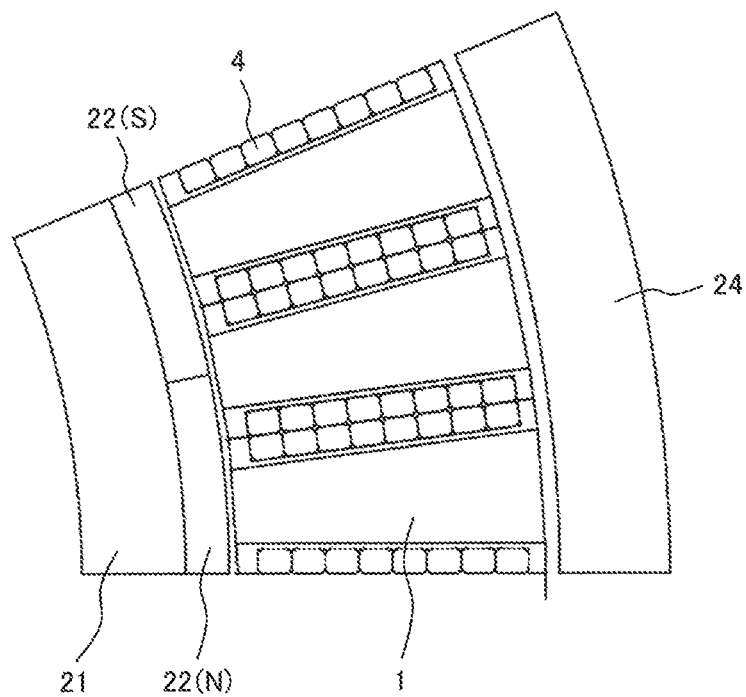
FIG. 7 is a top view illustrating a second example of the radial-gap-type rotary electric machine of the present invention.

FIG. 7 is a top view illustrating a second example of the radial-gap-type rotary electric machine of the present invention. FIG. 7 illustrates an inner-rotor-type structure. That is, an inner-rotor-type structure is formed without disposing the permanent magnet on the outer-peripheral-side rotator in FIG. 6. An outer-peripheral-side rotator iron core (an outer-peripheral-side rotor) is made independent from an inner-peripheral-side rotator iron core (an inner-peripheral-side rotor), and a gap between the outer-peripheral-side rotor and the teeth is eliminated to integrate the outer-peripheral-side rotator iron core with a stator iron core, thus ensuring a configuration of an inner rotor motor where the inner-peripheral-side rotator iron core (the inner-peripheral-side rotor) rotates with respect to an integrated member of the outer-peripheral-side rotator iron core and the stator iron core.

Figure 8:
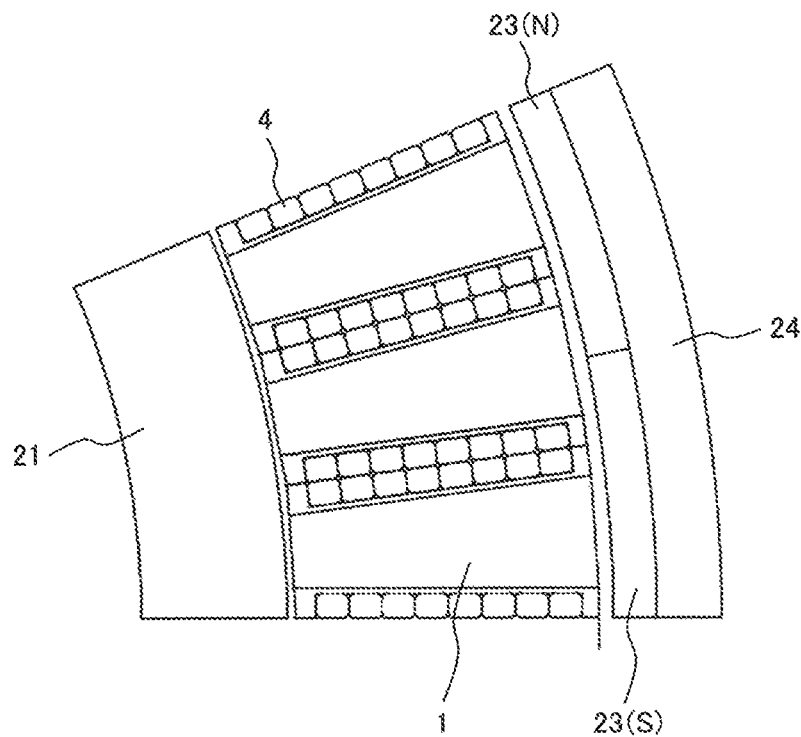
FIG. 8 is a top view illustrating a third example of the radial-gap-type rotary electric machine of the present invention.

FIG. 8 is a top view illustrating a third example of the radial-gap-type rotary electric machine of the present invention. In FIG. 8, in contrast to FIG. 7, an outer-rotor-type structure is formed without disposing the permanent magnet on the inner-peripheral-side rotator in FIG. 6. The inner-peripheral-side rotator iron core (the inner-peripheral-side rotor) is made independent from the outer-peripheral-side rotator iron core (the outer-peripheral-side rotor), and a gap between the inner-peripheral-side rotor and the teeth is eliminated to integrate the inner-peripheral-side rotator iron core with the stator iron core, thus ensuring a configuration of an outer rotor motor where the outer-peripheral-side rotator iron core (the outer-peripheral-side rotor) rotates with respect to an integrated member of the inner-peripheral-side rotor iron core and the stator iron core.

Figure 9:
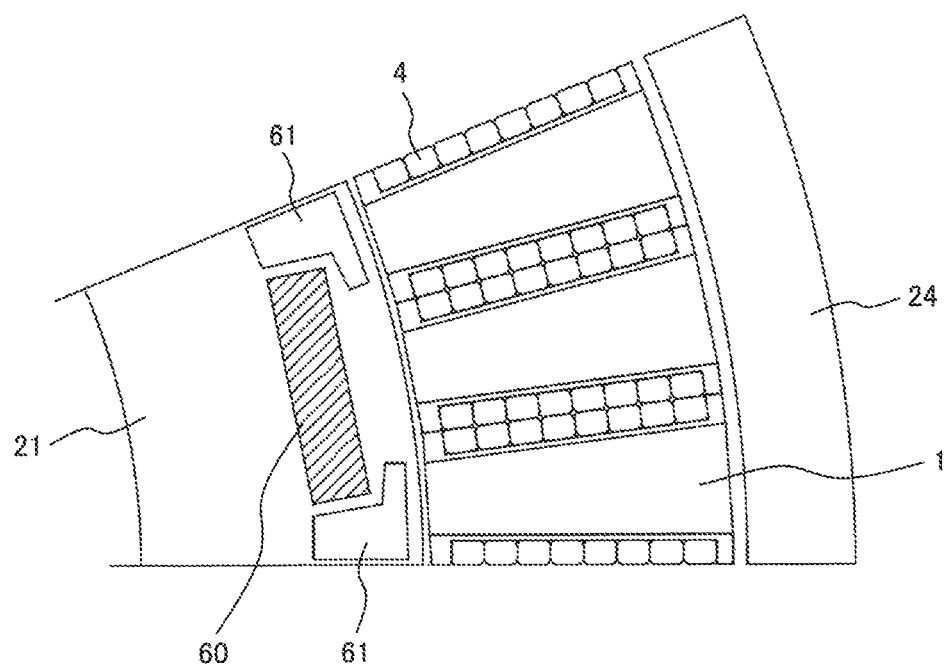
FIG. 9 is a top view illustrating a fourth example of the radial-gap-type rotary electric machine of the present invention.

FIG. 9 is a top view illustrating a fourth example of the radial-gap-type rotary electric machine of the present invention. FIG. 9 is an Interior Permanent Magnet Motor (IPM) structure. In the examples described up to the present, the permanent magnet is disposed on the surface of the rotator, while a rectangular parallelepiped permanent magnet (an embedded magnet 60) can be inserted and arranged into an embedded magnet holding member 61 inside the electromagnetic steel plate to form an embedded-magnet-type motor. The embedded magnet 60 may be a single body or may be divided into a plurality of pieces to be disposed. Here, the inner rotor type is illustrated as an object, while an outer-rotor-type embedded-magnet-type motor can also be configured, and a structure where both of two rotators are embedded magnet type is also possible.

[Production Device and Production Method for Rotary Electric Machine Teeth]

Figure 10A:
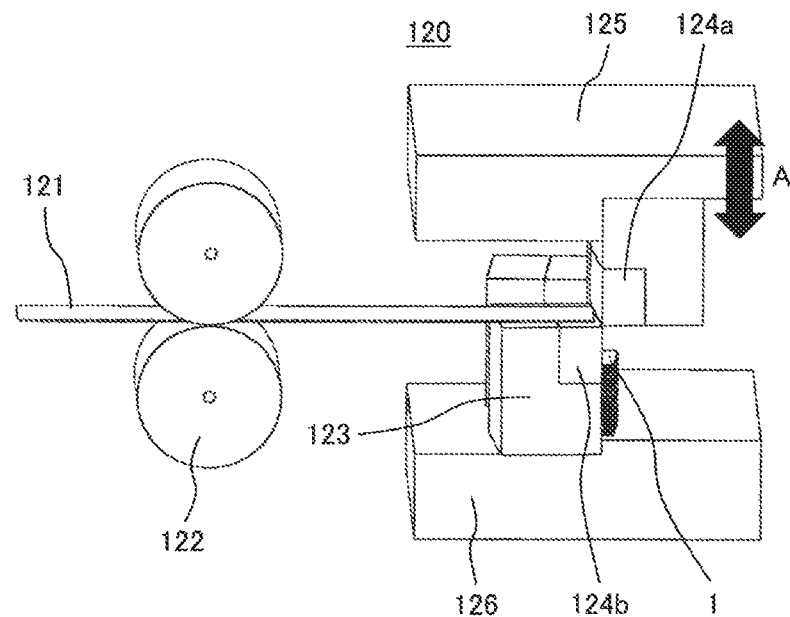
FIG. 10A is a perspective view schematically illustrating an exemplary device that cuts a material sheet of an amorphous metal.
Figure 10B:
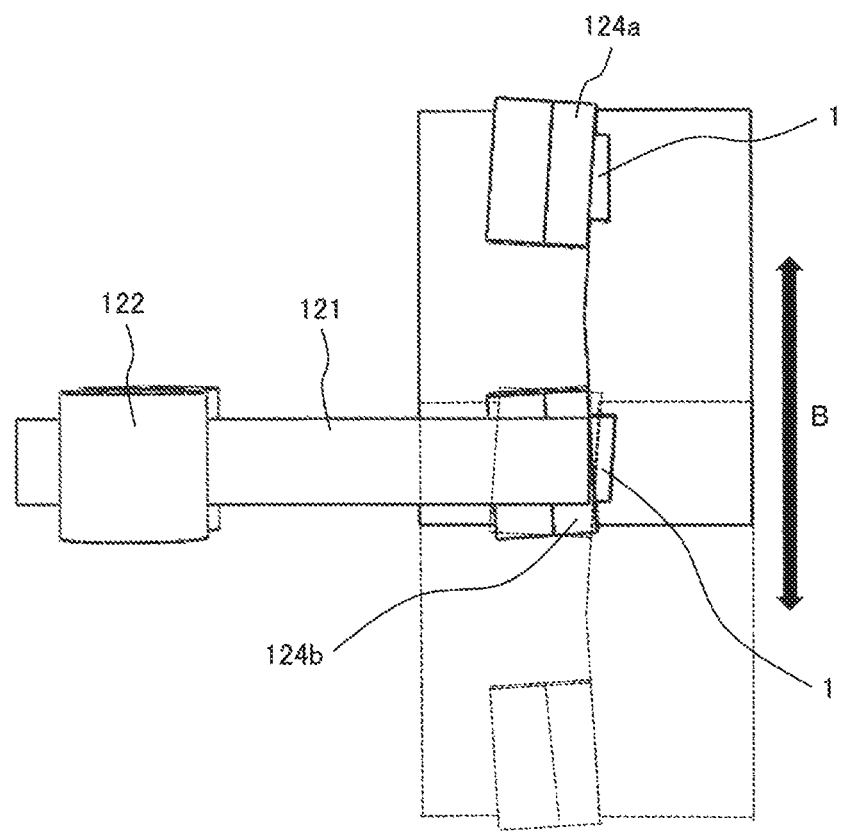
FIG. 10B is a top view of FIG. 10A.

The following describes a device and a method that can efficiently produce the above-described laminated body of the trapezoidal-shaped amorphous metal foil strip pieces. FIG. 10A is a perspective view schematically illustrating an exemplary device that cuts a strip-shaped material sheet of the amorphous metal (an amorphous material hoop). FIG. 10B is a top view of FIG. 10A. As illustrated in FIG. 10A, a cutting apparatus 120 includes a feed roller 122 which feeds an amorphous-metal-foil-strip material sheet 121, a cutting stage 123 which cuts the amorphous-metal-foil-strip material sheet 121, cutting blades (an upper blade 124a and a lower blade 124b) which cut the amorphous-metal-foil-strip material sheet 121 into a trapezoidal shape, an upper plate 125 which supports the upper blade 124a, and a base plate 126 which supports the cutting stage 123.

The amorphous-metal-foil-strip material sheet 121 is supplied to the cutting stage 123 by the feed roller 122 at equal intervals. The amorphous-metal-foil-strip material sheet fed to the cutting stage 123 has legs that are shear-cut by the upper blade 124a and the lower blade 124b to be the amorphous metal foil strip piece, and then, the amorphous metal foil strip pieces are sequentially continuously laminated on the base plate 126 to produce a laminated body 1. In such a system, the cutting blade has a simple shape, thus facilitating installing on and removing from the die, which reduces the cost, and facilitating maintenance such as repolishing. In view of this, efficient production is ensured by sufficiently reducing the production cost with respect to disadvantage in production due to the hardness and the thinness of the amorphous metal.

However, when the cutting is evenly performed by one set of cutting blades, a parallelogram amorphous metal foil strip piece is formed. Therefore, in the production device and method of the present invention, as indicated by a solid line and a dotted line in FIG. 10B, two sets of the pair of cutting blades of the upper blade 124a and the lower blade 124b having respective different angles (blades that cut one leg and blades that cut another leg) are prepared, and the upper and lower cutting blades are synchronized to be alternately used one set by one set. Movement in an arrow A direction (a direction perpendicular to the amorphous-metal-foil-strip material sheet) in FIG. 10A and an arrow B direction (a width direction of the amorphous-metal-foil-strip material sheet) in FIG. 10B ensures continuous cutting while making angles. Accordingly, the trapezoidal-shaped amorphous metal foil piece can be continuously formed only by performing the cutting such that the angle between the pair of legs is θ.

Figure 11:
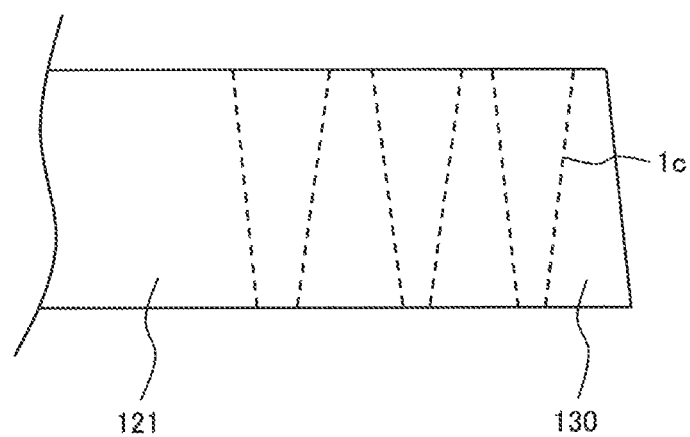
FIG. 11 is a top view schematically illustrating a material sheet of an amorphous metal foil strip.

FIG. 11 is a top view schematically illustrating the amorphous-metal-foil-strip material sheet 121. According to the above-described production device, only cutting a leg 1c indicated by a dotted line in FIG. 11 can form the amorphous-metal-foil-strip material sheet 121 into the trapezoidal shape to make the amorphous metal foil strip pieces one by one.

It is also possible to cut the amorphous foil strip while making angles by moving the cutting stage 123 using a mechanical cam or the like. Furthermore, a sufficient production speed can be expected as well in a method that intermittently feeds the amorphous metal foil strip with the feed roller 122 and operates the upper blade 124a and the lower blade 124b by electric slide in synchronization with the intermittent feed operation. A cutting speed can be expected at around 200 SPM. Furthermore, supplying a plurality of laminated amorphous-foil-strip material sheets 121 ensures the production at a production speed that can be expected to have an effect commercially.

The laminated body 1 laminated on the base plate 126 is managed and arrayed to have a predetermined axial length (height) in a method such as a number management or a weight management of the amorphous metal foil strip pieces that constitute the laminated body 1. Then, the laminated body 1 is inserted into the resin-made bobbin to complete a teeth block.

As described above, it has been proven that the present invention can provide the radial-gap-type rotary electric machine, the production method for the radial-gap-type rotary electric machine, the production device for the rotary electric machine teeth piece, and the production method for the rotary electric machine teeth member using the amorphous metal that can achieve the high efficiency and have the excellent productivity.

The present invention is not limited to the above-described embodiments but includes various modifications. For example, the above-described embodiments have been described in detail in order to easily describe the present invention, and therefore, it is not necessarily limited to include all the described configurations. It is possible to replace a part of the configuration of one embodiment with a configuration of another embodiment, and it is possible to add a configuration of one embodiment to a configuration of another embodiment. Some of the configurations of each embodiment can be added to, deleted from, or replaced by other configurations.

REFERENCE SIGNS LIST

10 . . . housing,
11 . . . stator iron core,
12 . . . stator coil,
13 . . . permanent magnet,
14 . . . rotator iron core,
15 . . . chassis,
17, 37 . . . shaft,
18 . . . bearing,
19 . . . end bracket,
100 . . . radial-gap-type rotary electric machine,
101 . . . stator,
102 . . . rotator,
1 . . . tooth (laminated body of amorphous metal foil strip pieces),
3 . . . resin-made bobbin, 4 . . . coil conductor,
20 . . . stator base,
21, 24 . . . soft magnetic material,
22, 23 . . . permanent magnet,
25 . . . stator iron core,
26 . . . bearing holding portion,
27 . . . bearing holding plate,
31 . . . rotator iron core,
31a . . . inner-peripheral-side rotator iron core,
31b . . . outer-peripheral-side rotator iron core,
32 . . . ring-shaped holding member,
37 . . . rotation shaft (shaft),
38 . . . bearing,
50 . . . teeth member,
60 . . . embedded magnet,
61 . . . embedded magnet holding member,
120 . . . cutting apparatus,
121 . . . amorphous-metal-foil-strip material sheet,
122 . . . feed roller,
123 . . . cutting stage,
124a . . . upper blade,
124b . . . lower blade,
125 . . . upper plate,
126 . . . base plate,
130 . . . amorphous metal foil strip,
301 . . . protrusion

The invention claimed is:

1. A radial-gap-type rotary electric machine comprising:
a rotation shaft;
a rotator including an inner-peripheral-side rotator iron core rotatable around the rotation shaft and an outer-peripheral-side rotator iron core arranged on an outer peripheral side of the inner-peripheral-side rotator iron core and rotatable around the rotation shaft; and
a stator disposed between the inner-peripheral-side rotator iron core and the outer-peripheral-side rotator iron core,
wherein a permanent magnet is provided on at least one of an outer-peripheral-side surface of the inner-peripheral-side rotator iron core and an inner-peripheral-side surface of the outer-peripheral-side rotator iron core, and
the stator includes a stator iron core, including:
teeth formed of laminated bodies where amorphous metal foil strip pieces are held with mutual friction, and
a resin-made bobbin that holds the laminated body.

2. The radial-gap-type rotary electric machine according to claim 1,
wherein the stator iron core includes a teeth member, the teeth member including the teeth formed of the laminated body where the amorphous metal foil strip pieces having trapezoidal shapes in plan view are laminated in an axial direction of the rotation shaft, the resin-made bobbin, and a coil conductor wound around an outside of the resin-made bobbin along a lamination direction of the laminated body, and
a plurality of the teeth members are arranged in an annular shape and molded with a resin.

3. The radial-gap-type rotary electric machine according to claim 2, wherein the coil conductor is held between resin-made bobbins that are adjacent.

4. The radial-gap-type rotary electric machine according to claim 2, wherein the teeth have end portions on a side of the rotation shaft, and the end portions project from each of the resin-made bobbins.

5. The radial-gap-type rotary electric machine according to claim 2, wherein the stator iron core has a lower end portion that is integrated with a chassis of the stator with the resin.

6. The radial-gap-type rotary electric machine according to claim 1,
wherein a permanent magnet is provided on the inner-peripheral-side surface of the outer-peripheral-side rotator iron core, and
the inner-peripheral-side rotator iron core and the stator iron core are integrated.

7. The radial-gap-type rotary electric machine according to claim 1,
wherein a permanent magnet is provided on the outer-peripheral-side surface of the inner-peripheral-side rotator iron core, and
the outer-peripheral-side rotator iron core and the stator iron core are integrated.

8. The radial-gap-type rotary electric machine according to claim 1, wherein the permanent magnet is embedded in an inside of the inner-peripheral-side rotator iron core or the outer-peripheral-side rotator iron core.

* * * * *